US009367373B2

(12) United States Patent
Muncey et al.

(10) Patent No.: US 9,367,373 B2
(45) Date of Patent: Jun. 14, 2016

(54) AUTOMATIC CONFIGURATION CONSISTENCY CHECK

(75) Inventors: Harry Michael Muncey, Rancho Santa Margarita, CA (US); Justin A. Okun, Lake Forest, CA (US); Michael Alan Gale, Aliso Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/330,781

(22) Filed: Dec. 20, 2011

(65) Prior Publication Data

US 2013/0117436 A1 May 9, 2013

Related U.S. Application Data

(60) Provisional application No. 61/557,481, filed on Nov. 9, 2011.

(51) Int. Cl.
*G06F 15/173* (2006.01)
*G06F 15/16* (2006.01)
*G06F 11/07* (2006.01)
*H04L 12/24* (2006.01)

(52) U.S. Cl.
CPC ........ *G06F 11/0709* (2013.01); *G06F 11/0751* (2013.01); *H04L 41/0869* (2013.01); *H04L 41/0893* (2013.01)

(58) Field of Classification Search
CPC ............ H04L 41/0893; H04L 41/0869; G06F 11/0709; G06F 11/0751
USPC .................................. 709/200, 203, 223–224
See application file for complete search history.

(56) References Cited

U.S. PATENT DOCUMENTS

| 6,014,700 | A  | * | 1/2000  | Bainbridge | G06F 9/505 709/226 |
| 7,366,521 | B2 | * | 4/2008  | Collins | H04W 76/021 455/450 |
| 7,464,367 | B2 | * | 12/2008 | Wain | G06F 8/34 715/762 |
| 7,539,744 | B2 | * | 5/2009  | Matthews | H04L 41/0806 709/223 |
| 7,592,906 | B1 | * | 9/2009  | Hanna | H04L 63/20 340/506 |
| 8,065,682 | B2 | * | 11/2011 | Baryshnikov | G06F 9/5027 718/100 |
| 8,255,915 | B1 | * | 8/2012  | Blanding | G06F 9/5027 709/223 |
| 8,260,893 | B1 | * | 9/2012  | Bandhole | G06F 9/5083 709/221 |
| 8,326,910 | B2 | * | 12/2012 | Bobak | H04L 41/5012 709/200 |

(Continued)

*Primary Examiner* — Viet Vu
*Assistant Examiner* — Michael A Chambers
(74) *Attorney, Agent, or Firm* — Robert P. Marley

(57) ABSTRACT

Reliability and performance of complex applications executed across workload groups of one or more host computer systems may be improved by automating the verification of consistent policies across the workload groups. An automatic verification process may be executed on a host computer system to identify workload groups that are not collecting statistics, to identify polices that are not enforced on certain workload groups, to identify policies that are not in force for certain periods of the day, and to identify policies that are disabled. Where an application has a complex configuration, the automatic verification process allows an administrator to identify inconsistent policies.

13 Claims, 7 Drawing Sheets

(56) References Cited

U.S. PATENT DOCUMENTS

| | | | | |
|---|---|---|---|---|
| 8,738,412 B2* | 5/2014 | Flockhart | G06Q 10/06 | 705/7.14 |
| 8,839,344 B2* | 9/2014 | Becker | G06F 21/552 | 707/781 |
| 8,930,521 B2* | 1/2015 | Cocks | H04L 43/024 | 709/220 |
| 2003/0125059 A1* | 7/2003 | Collins | H04W 76/021 | 455/509 |
| 2005/0015745 A1* | 1/2005 | Wain | G06F 8/34 | 717/105 |
| 2005/0154576 A1* | 7/2005 | Tarui | H04L 41/0853 | 703/22 |
| 2006/0004765 A1* | 1/2006 | Anderson | G06F 17/30067 | |
| 2006/0015388 A1* | 1/2006 | Flockhart | G06Q 10/06 | 705/7.13 |
| 2006/0090136 A1* | 4/2006 | Miller | G06F 9/45504 | 715/734 |
| 2007/0067366 A1* | 3/2007 | Landis | G06F 12/109 | |
| 2007/0250615 A1* | 10/2007 | Hillier | H04L 41/0869 | 709/223 |
| 2008/0172714 A1* | 7/2008 | Ono | H04L 63/20 | 726/1 |
| 2008/0281958 A1* | 11/2008 | McKinnon | G06F 9/5027 | 709/224 |
| 2009/0249064 A1* | 10/2009 | De Atley | G06F 21/51 | 713/164 |
| 2009/0249065 A1* | 10/2009 | De Atley | G06F 21/51 | 713/164 |
| 2009/0249075 A1* | 10/2009 | De Atley | G06F 21/51 | 713/176 |
| 2009/0254753 A1* | 10/2009 | De Atley | G06F 21/51 | 713/176 |
| 2010/0005473 A1* | 1/2010 | Blanding | G06F 9/5044 | 718/104 |
| 2010/0205156 A1* | 8/2010 | Anderson | G06F 17/30067 | 707/690 |
| 2010/0332640 A1* | 12/2010 | Goodrow | H04L 41/0856 | 709/223 |

* cited by examiner

AUTOMATIC CONFIGURATION CONSISTENCY CHECK

CROSS REFERENCE TO RELATED APPLICATIONS

The present application claims priority to U.S. Provisional Patent Application No. 61/557,481, dated Nov. 9, 2011, the disclosure of which is hereby incorporated by reference in its entirety.

The instant disclosure relates to applications. More specifically, this disclosure relates to verifying consistency in an application.

BACKGROUND

Complex applications executing on a host computer system have complicated and lengthy configurations. The complexity and length of the configuration may prevent an administrator from correctly setting and verifying every portion of the configuration for the application. Thus, inconsistencies may occur between best practices for the application and the actual application configuration file. These inconsistencies cause degraded performance of the application. The inconsistencies may also cause failures in the application that are difficult to trace and solve.

SUMMARY

According to one embodiment, a method includes retrieving policies for at least one workload group of a host computer system. The method also includes retrieving a reference policy for the at least one workload group. The method further includes verifying a consistency of the policies for the at least one workload group and the reference policy.

According to another embodiment, a computer program product includes a non-transitory medium having code to retrieve policies for at least one workload group of a host computer system. The medium also includes code to retrieve a reference policy for the at least one workload group. The medium further includes code to verify a consistency of the policies for the at least one workload group and the reference policy.

According to a further embodiment, an apparatus includes a processor and a memory coupled to the processor. The processor is configured to retrieve policies for at least one workload group of a host computer system. The processor is also configured to retrieve a reference policy for the at least one workload group. The processor is further configured to verify a consistency of the policies for the at least one workload group and the reference policy.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Policies on host computer systems may be verified for consistency automatically to ensure proper configuration of applications on the host computer systems. When an application executes within multiple workload groups across multiple host computer systems, consistency checks may be executed remotely from any location on a network connected to the host computer systems. The policies for a host computer system may be verified, for example, by ensuring policies have a goal for each workload group, a policy is assigned for each time period of the day, and each host has an assigned policy for the workload groups within the host. Reports may be generated and displayed to the administrator on a screen or through a remote connection.

Figure 1:
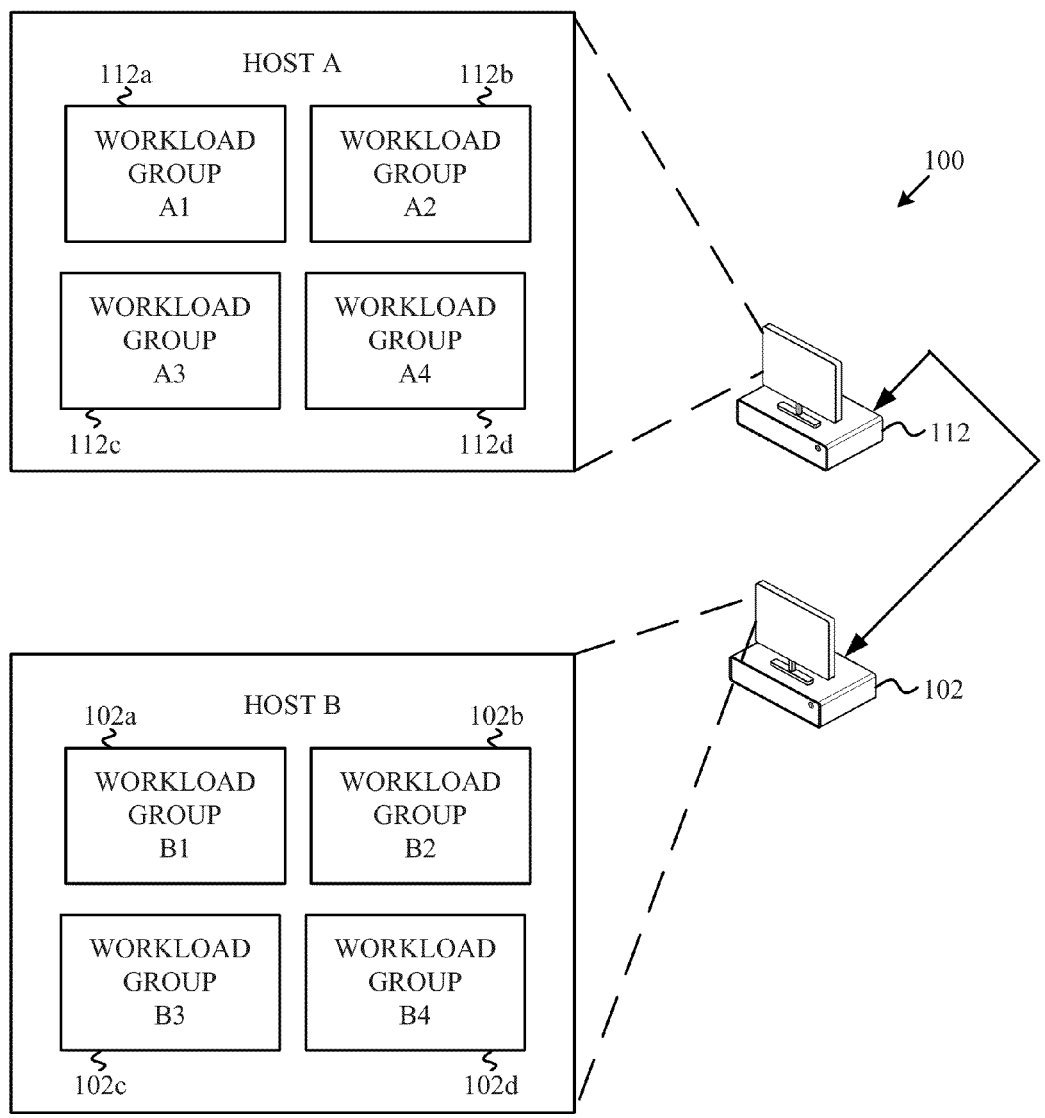
FIG. 1 is a block diagram illustrating a network of hosts including a number of workload groups for executing applications according to one embodiment of the disclosure.

FIG. 1 is a block diagram illustrating a network of hosts including a number of workload groups for executing applications according to one embodiment of the disclosure. A network 100 of connected hosts 102 and 112 may be executing application independently or operating together to share the workload of an application. Each host 102, 112 includes a number of workload groups 102a-d and 112a-d, respectively.

Figure 2:
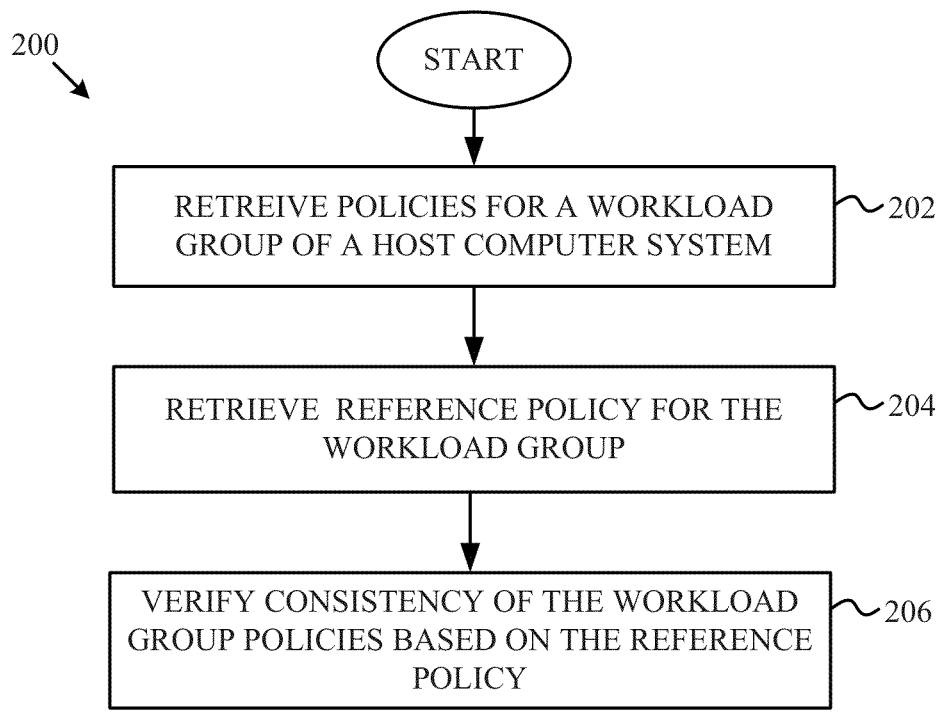
FIG. 2 is a flow chart illustrating an exemplary method of verifying consistency of policies within a host computer system according to one embodiment of the disclosure.

FIG. 2 is a flow chart illustrating an exemplary method of verifying consistency of policies within a host computer system according to one embodiment of the disclosure. A method 200 begins at block 202 with retrieving policies for a workload group of a host computer. When the consistency check is executed on the host performing the consistency check, the retrieval may include reading a configuration file on the host computer system or accessing registry entries on the host computer system. When the consistency check is executed from another computer system on the network, the retrieval may include downloading a configuration file or other information over a network interface.

At block 204, a reference policy is retrieved for the workload group. The reference policy may be located in a file of a storage device, such as a computer readable medium, or of a network storage device, such as a network attached storage device. According to one embodiment, the reference policy may be a fixed policy. For example, the fixed policy may be a policy specifying that a policy must be in effect 24 hours per day. An administrator may configure the reference policy or create multiple files with different reference policies and allow selection of one policy when executing the consistency check.

At block 206, the consistency of the workload group of a host computer system is verified based on the reference policy. The consistency check compares the reference policy with the retrieved policy for a host computer system.

Figure 3:
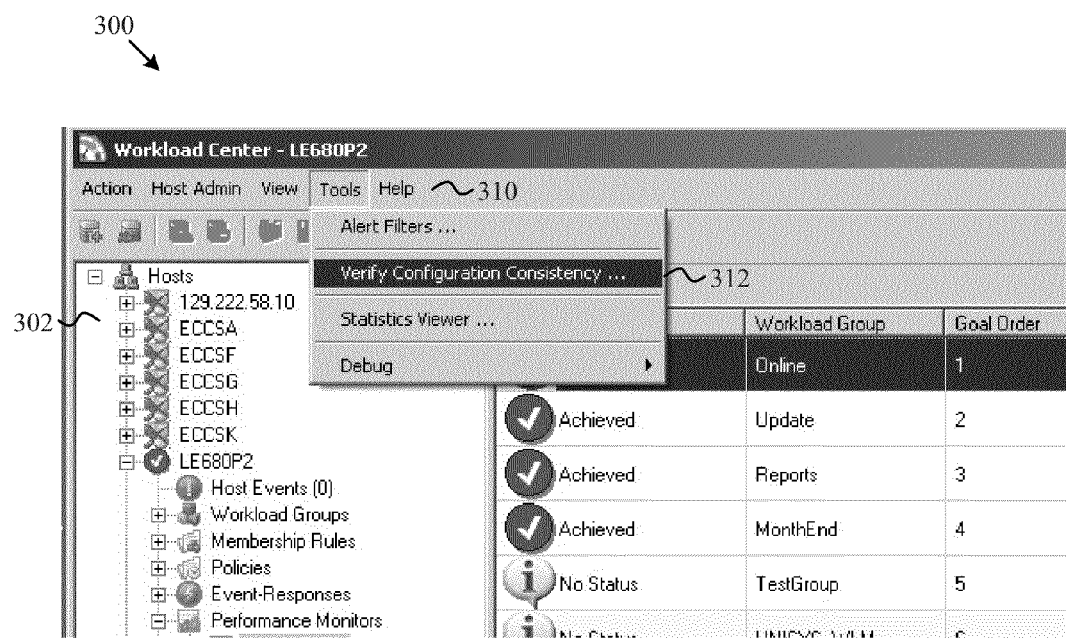
FIG. 3 is a screen shot illustrating a network manager for host computer systems executing an application according to one embodiment of the disclosure.

FIG. 3 is a screen shot illustrating a network manager for host computer systems executing an application according to one embodiment of the disclosure. A screen 300 may include a list of hosts 302 connected to an administrator's console. Each of the hosts may be expanded to view information regarding an individual host. For example, the screen 300 may include information regarding host events, workload groups, membership rules, policies, event responses, and performance monitors for each of the hosts on the list of hosts 302. The screen 300 may also include a menubar 310 having commands organized within menus for performing actions on each of the hosts in the list of hosts 302 and changing information organization on the screen 300. The menubar 310 may include, as one action for the hosts on the list of hosts 302, an action 312 for verifying configuration consistency.

To begin the verification process, an administrator may select a host from the list of hosts 302. Then, the administrator may select the action 312 to begin verifying configuration consistency for the selected host on the list of hosts 302. Although only a menubar 310 is illustrated on the screen 300. The screen 300 may include a toolbar and/or a context menu that allows an administrator to take actions on a host of the list of hosts 302. For example, an administrator may right-click on one of the hosts on the list of hosts 302 and select "Verify Configuration Consistency" from the context menu that appears after right-clicking the host.

Figure 4:
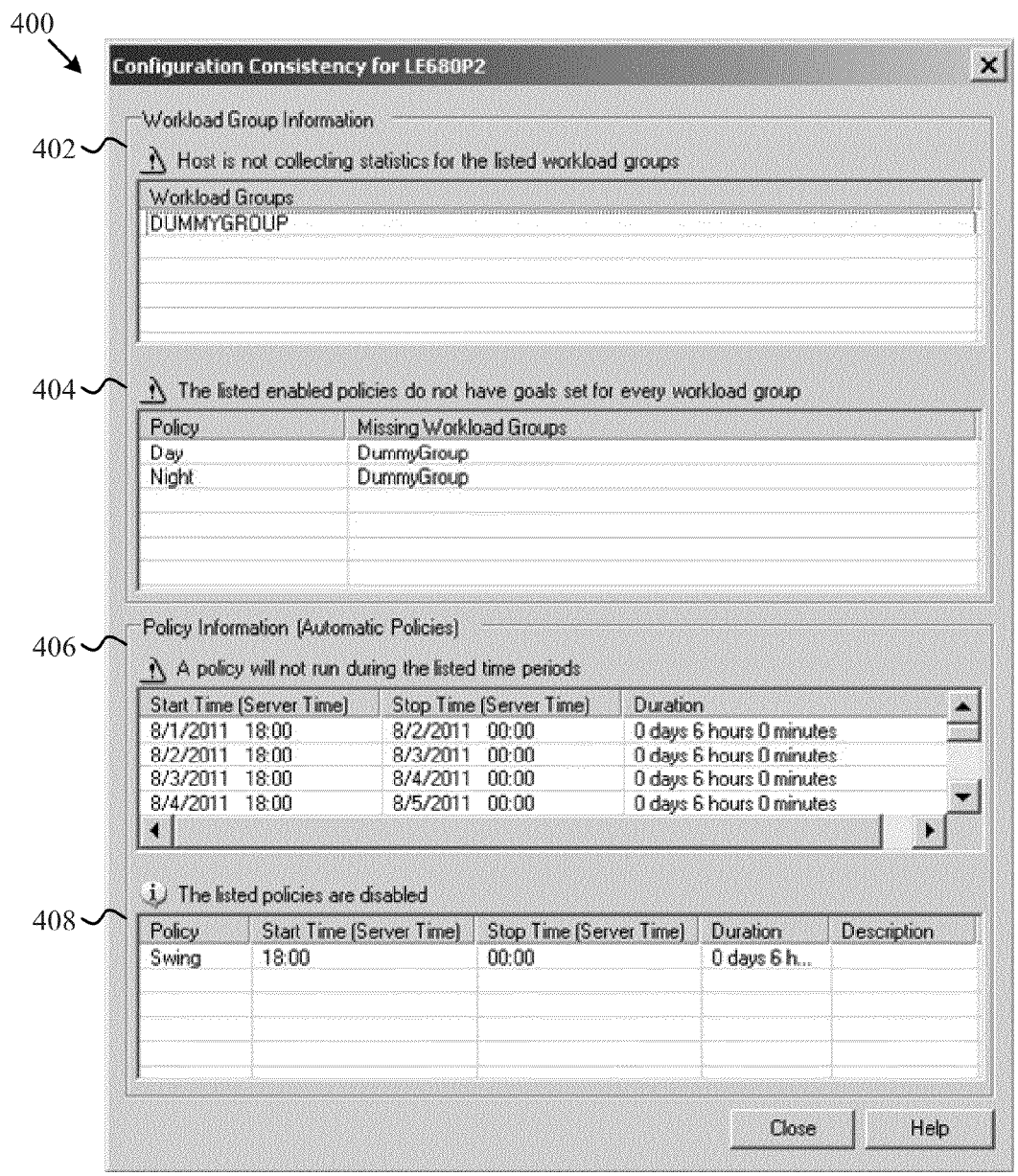
FIG. 4 is a screen shot illustrating a consistency check report according to one embodiment of the disclosure.

After selecting the action for verifying configuration consistency in the screen 300, the administrator's computer system executes the method 200 illustrated in FIG. 2. After the verification process of the method 200 is complete, the results of the consistency check may be illustrated to the administrator. FIG. 4 is a screen shot illustrating a consistency check report according to one embodiment of the disclosure.

A screen 400 may include the results of each portion of the consistency check. For example, the screen 400 may include a section 402 listing workload groups that are not collecting statistics information. According to one embodiment, the reference policy retrieved for verifying consistency of the workload group policies may specify that all workload groups are required to be collecting statistics information. Thus, the section 402 may list any workload group that does not collect statistics information. In another embodiment, the reference policy may specify specific workload groups that are to be collecting information. For example, when some workload groups are configured as test environments and other workload groups are configured as production environments, the reference policy may specify information collection is required only for the workload group configured as test environments.

In another example, the screen 400 may include a section 404 listing enabled policies that do not have any goals assigned for each workload group. According to one embodiment, the reference policy retrieved for verifying consistency of the workload group policies may specify that goals are required for all policies for a workload group. Thus, the section 404 may list any policy assigned to a workload group that does not include a goal. In another embodiment, the reference policy may specify specific policies for workload groups that are required to include goals. The section 404 may only list policies required to include goals for workload group but do not include goals.

In yet another example, the screen 400 may include a section 406 listing times during which no policy is assigned for a workload group. According to one embodiment, the reference policy retrieved for verifying consistency of the workload group policies may specify that at least one policy is required to be active at all times throughout the day for each workload group. Thus, the section 406 may list any time gaps in policy coverage and the duration of the time gap. For example, the section 406 may include an entry indicating that between "Aug. 1, 2011 18:00" and "Aug. 2, 2011 00:00" there is no assigned policy, and the time gap has a duration of "0 days 6 hours 0 minutes." In another embodiment, the reference policy may specify periods of the day for which policies are required for workload groups. Thus, the section 406 may include a listing only of times during which a policy is required but no policy is set.

In a further example, the screen 400 may include a list of policies that are disabled. According to one embodiment, the reference policy requires that all policies are enabled. Thus, a section 408 may include an entry for each policy that is not enabled for at least a portion of a day. The entry may include a specification of the times and duration that the policy is disabled. For example, an entry may list that the policy "Swing" is not active between "18:00" and "00:00" for "0 days 6 hours 0 minutes" each day. In another embodiment, the reference policy may include specific policies and/or specific period of time each day that a policy is required to be enabled. Thus, the section 406 may include a listing only of times during which a policy is required to be enabled but the policy is disabled.

Figure 5:
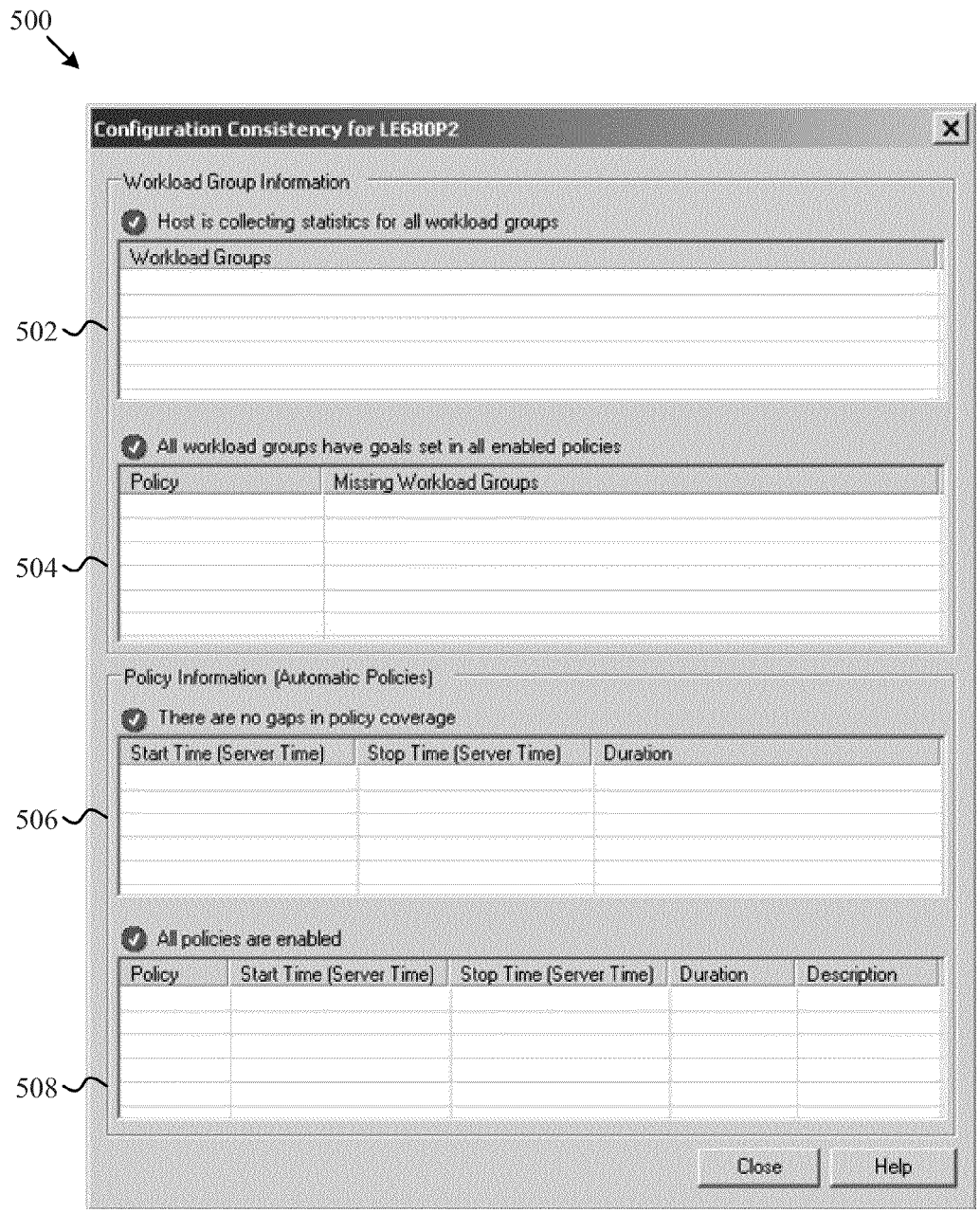
FIG. 5 is a screen shot illustrating a consistency check report according to one embodiment of the disclosure.

A consistency check may result in a finding that there are no inconsistencies in any one the sections 402-408. When no inconsistencies are identified for one of the sections 402-408 a message may be provided to allow the administrator to quickly identify that no inconsistencies exist. FIG. 5 is a screen shot illustrating a consistency check report according to one embodiment of the disclosure. A screen 500 includes sections 502, 504, 506, and 508 providing information to an administrator about the outcome of various portions of a consistency check. The screen 500 illustrates a report indicating that all consistency checks have passed. That is, the policies assigned to the workload groups of the host meet the minimum requirements of the reference policies as verified by the method 200 of FIG. 2. Although FIG. 5 illustrates that the sections 502-508 passed the verification process, the screen 500 may alternatively indicate that some of the sections 502-508 have passed the verification process and others of the sections 502-508 have not passed the verification process.

Although not illustrated in the screen 500 of FIG. 5, the screen 500 may also include recommendations to the administrator for correcting inconsistencies. For example, the section 502 may include a recommendation on enabling statistics collection for certain workload groups. In particular, the section 502 may recommend enabling statistics collection on workload group that are part of a test environment such that an administrator may have debug information available for evaluating the test environment.

The consistency check described above may be implemented, either manually or automatically, to verify the policies of one or more host computer systems when an application is initially set up on the host computer system. Additionally, the consistency check may be executed as part of a subsequent upgrade or environment change on the host computer system. Thus, the consistency check may identify problems in highly configurable and/or complex computer software products that an administrator may overlook. Improving the consistency of implemented policies on a host computer system improves performance of applications on the host computer system and reduces time that the application and/or host computer system is unavailable.

Figure 6:
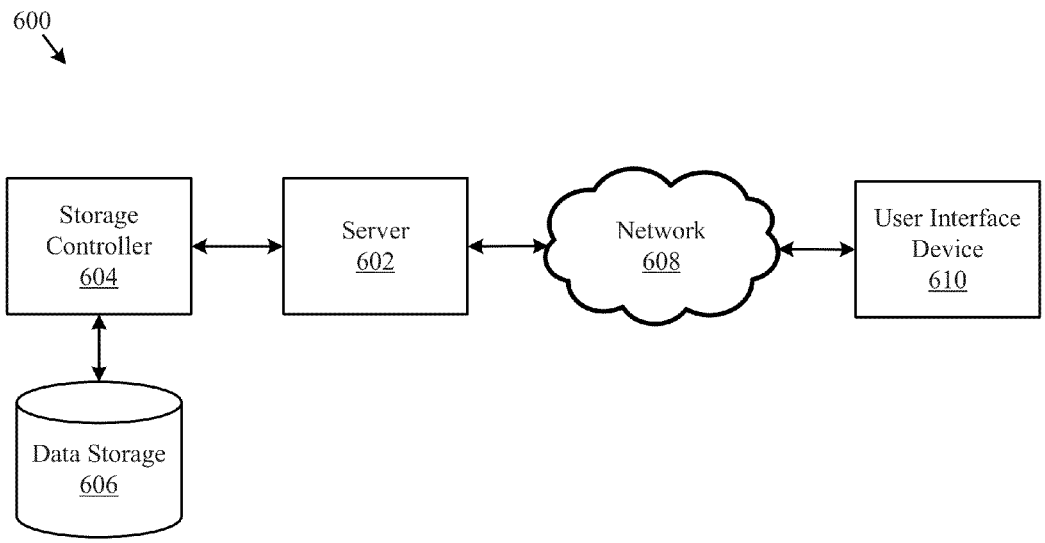
FIG. 6 is block diagram illustrating a computer network according to one embodiment of the disclosure.

FIG. 6 illustrates one embodiment of a system 600 for an information system. The system 600 may include a server 602, a data storage device 606, a network 608, and a user interface device 610. The server 602 may be a dedicated server or one server in a cloud computing system. In a further embodiment, the system 600 may include a storage controller 604, or storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone or other a mobile communication device having access to the network 608. When the device 610 is a mobile device, sensors (not shown), such as a camera or accelerometer, may be embedded in the device 610. When the device 610 is a desktop computer the sensors may be embedded in an attachment (not shown) to the device 610. In a further embodiment, the user interface device 610 may access the Internet or other wide area or local area network to access a web application or web service hosted by the server 602 and provide a user interface for enabling a user to enter or receive information.

The network 608 may facilitate communications of data, such as authentication information, between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

In one embodiment, the user interface device 610 accesses the server 602 through an intermediate sever (not shown). For example, in a cloud application the user interface device 610 may access an application server. The application server fulfills requests from the user interface device 610 by accessing a database management system (DBMS). In this embodiment, the user interface device 610 may be a computer or phone executing a Java application making requests to a JBOSS server executing on a Linux server, which fulfills the requests by accessing a relational database management system (RDMS) on a mainframe server.

Figure 7:
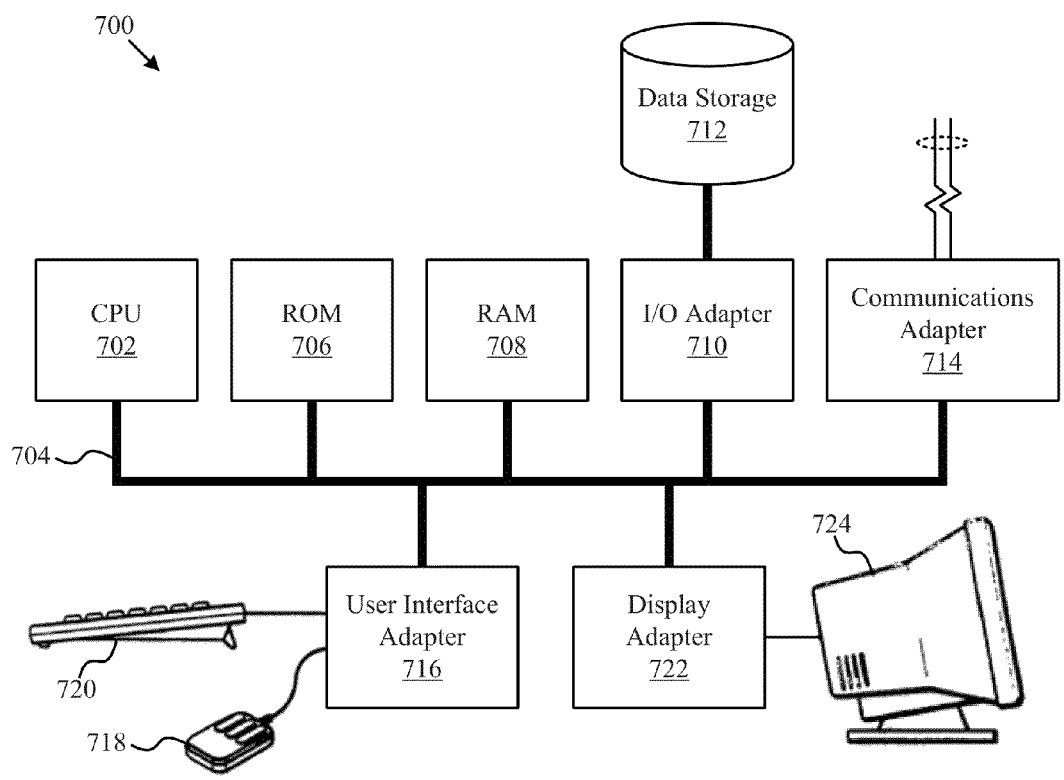
FIG. 7 is a block diagram illustrating a computer system according to one embodiment of the disclosure.

FIG. 7 illustrates a computer system 700 adapted according to certain embodiments of the server 602 and/or the user interface device 610. The central processing unit ("CPU") 702 is coupled to a system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the modules and operations as described herein. The CPU 702 may execute the various logical instructions according to the present embodiments.

The computer system 700 also may include random access memory (RAM) 708, which may be synchronous RAM (SRAM), dynamic RAM (DRAM), and/or synchronous dynamic RAM (SDRAM). The computer system 700 may utilize RAM 708 to store the various data structures used by a software application. The computer system 700 may also include read only memory (ROM) 706 which may be PROM, EPROM, EEPROM, optical storage, or the like. The ROM may store configuration information for booting the computer system 700. The RAM 708 and the ROM 706 hold user and system data.

The computer system 700 may also include an input/output (I/O) adapter 710, a communications adapter 714, a user interface adapter 716, and a display adapter 722. The I/O adapter 710 and/or the user interface adapter 716 may, in certain embodiments, enable a user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a flash drive, a compact disc (CD) drive, a floppy disk drive, and a tape drive, to the computer system 700. The communications adapter 714 may be adapted to couple the computer system 700 to the network 608, which may be one or more of a LAN, WAN, and/or the Internet. The communications adapter 714 may also be adapted to couple the computer system 700 to other networks such as a global positioning system (GPS) or a Bluetooth network. The user interface adapter 716 couples user input devices, such as a keyboard 720, a pointing device 718, and/or a touch screen (not shown) to the computer system 700. The keyboard 720 may be an on-screen keyboard displayed on a touch panel. Additional devices (not shown) such as a camera, microphone, video camera, accelerometer, compass, and or a gyroscope may be coupled to the user interface adapter 716. The display adapter 722 may be driven by the CPU 702 to control the display on the display device 724.

The applications of the present disclosure are not limited to the architecture of computer system 700. Rather the computer system 700 is provided as an example of one type of computing device that may be adapted to perform the functions of a server 602 and/or the user interface device 610. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as transitory signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
retrieving, by a server, a plurality of policies for at least one workload group of a host computer system from a data storage device via a storage controller, wherein the server is coupled to the storage controller, wherein the storage controller is coupled to the data storage device;
retrieving, by the server, a reference policy for the at least one workload group from the data storage device via the storage controller, wherein the reference policy specifies that the at least one workload group requires an active policy for certain times of a week, and wherein the reference policy specifies that the retrieved policies for the at least one workload group require a goal for the at least one workload group to achieve, and wherein the reference policy specifies that the retrieved policies for the at least one workload group require a collection of statistics information by the at least one workload group;
verifying, by the server, a consistency of the policies for the at least one workload group with the reference policy by determining whether the retrieved policies for the at least one workload group specify an active policy for the certain times of the week identified by the reference policy and whether the retrieved policies for the at least one workload group contain a goal for the at least one workload group to achieve and whether the retrieved policies for the at least one workload group require a collection of statistics information by the at least one workload group;
determining, by the server, an inconsistency based on the verifying;
generating, by the server, a recommendation to correct the inconsistency;
providing, by the server, an information to a user interface device over a network, wherein the information comprises an outcome of the consistency verification and the recommendation, wherein the outcome informs of the inconsistency.

2. The method of claim 1, in which the reference policy is a fixed reference policy.

3. The method of claim 1, in which the reference policy is a reference policy configurable by an administrator.

4. The method of claim 1, further comprising upgrading an application on the host computer system before verifying the consistency of the policies.

5. The method of claim 1, further comprising recommending corrections to improve the consistency of the policies.

6. The method of claim 1, in which the step of verifying the consistency of the policies comprises at least one of:
identifying at least one workload group not collecting statistics;
identifying at least one of the retrieved policies with no goal for at least one workload group;
identifying a time during which none of the retrieved policies are active; and
identifying at least one disabled policy.

7. The method of claim 1, further comprising repeating the steps of retrieving policies, retrieving a reference policy, and verifying the consistency for a second host computer system.

8. An apparatus, comprising:
a processor; and
a memory coupled to the processor,
in which the processor is configured:
to retrieve a plurality of policies for at least one workload group of a host computer system from a data storage device via a storage controller, wherein the processor is coupled to the storage controller, wherein the storage controller is coupled to the data storage device;
to retrieve a reference policy for the at least one workload group from the data storage device via the storage controller, wherein the reference policy specifies that the at least one workload group requires an active policy for certain times of a week, and wherein the reference policy specifies that the retrieved policies for the at least one workload group require a goal for the at least one workload group to achieve, and wherein the reference policy specifies that the retrieved policies for the at least one workload group require a collection of statistics information by the at least one workload group;
to verify a consistency of the policies for the at least one workload group with the reference policy by determining whether the retrieved policies for the at least one workload group specify an active policy for the certain times of the week identified by the reference policy and whether the retrieved policies for the at least one workload group contain a goal for the at least one workload group to achieve and whether the retrieved policies for the at least one workload group require a collection of statistics information by the at least one workload group;
to determine an inconsistency based on the verifying;
to generate a recommendation to correct the inconsistency;
to provide an information to a user interface device over a network, wherein the information comprises an outcome of the consistency verification and the recommendation, wherein the outcome informs of the inconsistency.

9. The apparatus of claim 8, in which the reference policy is a fixed reference policy.

10. The apparatus of claim 8, in which the reference policy is a reference policy configurable by an administrator.

11. The apparatus of claim 8, in which the processor is further configured to upgrade an application on the host computer system before verifying the consistency of the policies.

12. The apparatus of claim 8, in which the processor is further configured to recommend corrections to improve the consistency of the policies.

13. The apparatus of claim 8, in which the processor is further configured to verify the consistency of the policies by at least one of:
   to identify at least one workload group not collecting statistics;
   to identify at least one of the retrieved policies with no goal for at least one workload group;
   to identify a time during which none of the retrieved policies are active; and
   to identify at least one disabled policy.

* * * * *